United States Patent
Mohanan et al.

(10) Patent No.: US 8,166,466 B2
(45) Date of Patent: Apr. 24, 2012

(54) FUNCTION MATCHING IN BINARIES

(75) Inventors: Harish Mohanan, Hyderabad (IN); Perraju Bendapudi, Hyderabad (IN); Abishek Kumarasubramanian, Chennai (IN); Rajesh Jalan, Hyderabad (IN); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1341 days.

(21) Appl. No.: 11/767,364

(22) Filed: Jun. 22, 2007

(65) Prior Publication Data
US 2008/0320056 A1 Dec. 25, 2008

(51) Int. Cl.
*G06F 9/45* (2006.01)

(52) U.S. Cl. ......... 717/144; 717/136; 717/140; 717/141

(58) Field of Classification Search .................. 717/144, 717/136, 140, 141
See application file for complete search history.

(56) References Cited

U.S. PATENT DOCUMENTS

| | | | |
|---|---|---|---|
| 5,978,588 A * | 11/1999 | Wallace | 717/159 |
| 6,233,589 B1 | 5/2001 | Balcha et al. | |
| 6,594,822 B1 | 7/2003 | Schweitz et al. | |
| 6,925,467 B2 | 8/2005 | Gu et al. | |
| 7,058,941 B1 * | 6/2006 | Venkatesan et al. | 717/168 |
| 7,065,759 B2 * | 6/2006 | Hank | 717/156 |
| 2004/0154009 A1 * | 8/2004 | Reynaud | 717/155 |
| 2005/0060696 A1 * | 3/2005 | Bicsak et al. | 717/156 |

OTHER PUBLICATIONS

Wenzel, et al. "Automatic Timing Model Generation by CFG Partitioning and Model Checking", 2005, IEEE, p. 1-6.*
Dullien et al., "Graph-based comparison of Executable Objects", pp. 1-13, Ruhr-Universitaet Bochum.
Srivastava et al., "Effectively Prioritizing Tests in Development Environment" ACM Press, 2002, pp. 97-106.
Raghavan et al., "Dex: A Semantic-Graph Differencing Tool for Studying Changes in Large Code Bases", IEEE, Sep. 11-14, 2004, pp. 10.
Zhang et al., "Matching Execution Histories of Program Versions", ACM Press, 2005, pp. 197-206.
Sinha et al., "GRAPHDIFF: Matching and Patching Program Binaries", pp. 11, Rockefeller University.
Wang et al.; "BMAT—A Binary Matching Tool for Stale Profile Propagation", vol. 2, Morgan Kaufmann Publishers, 2000, pp. 1-20.

* cited by examiner

*Primary Examiner* — Qamrun Nahar
(74) *Attorney, Agent, or Firm* — Zete Law, P.L.L.C.; MacLane C. Key (57) ABSTRACT

Which target functions in a target binary have target function basic blocks that match the source function basic blocks in a source function in a source binary is determined. For the target functions having matching target function basic blocks, a target function control flow graph is determined that has the greatest control flow matching strength to a source function control flow graph, wherein a node in the source function control graph represents a source function basic block, wherein a node in a target function control graph represents a target function basic block in a corresponding target function.

18 Claims, 6 Drawing Sheets

SOURCE
FUNCTION
CFG
300

TARGET
FUNCTION
CFG
310

| SOURCE BLOCK | TARGET BLOCK | MATCH QUALITY |
|---|---|---|
| S1 | T1 | 3 |
| S2 | T2 | 3 |
| S3 | T4 | 1 |
| S4 | T3 | CF |
| S5 | T5 | 1 |

FUNCTION MATCHING IN BINARIES

BACKGROUND

Functions in two separate binaries may match syntactically and/or semantically. Discovering whether functions in binaries match has various applications. Example applications include code plagiarism identification and test prioritization. In the case of test prioritization, if two functions (e.g., an old version and a new version) are very closely matched, then fewer test cases may be needed in order to test the new version of the function. The test cases may be targeted at the differential code of the new version with respect to the old version.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to function matching in binaries. A given source function from a source binary is compared to target functions in a target binary in order to find the target function that best matches the source function. The source and target functions are compared using the basic blocks of the functions as well as compared using control flow graphs of the functions.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
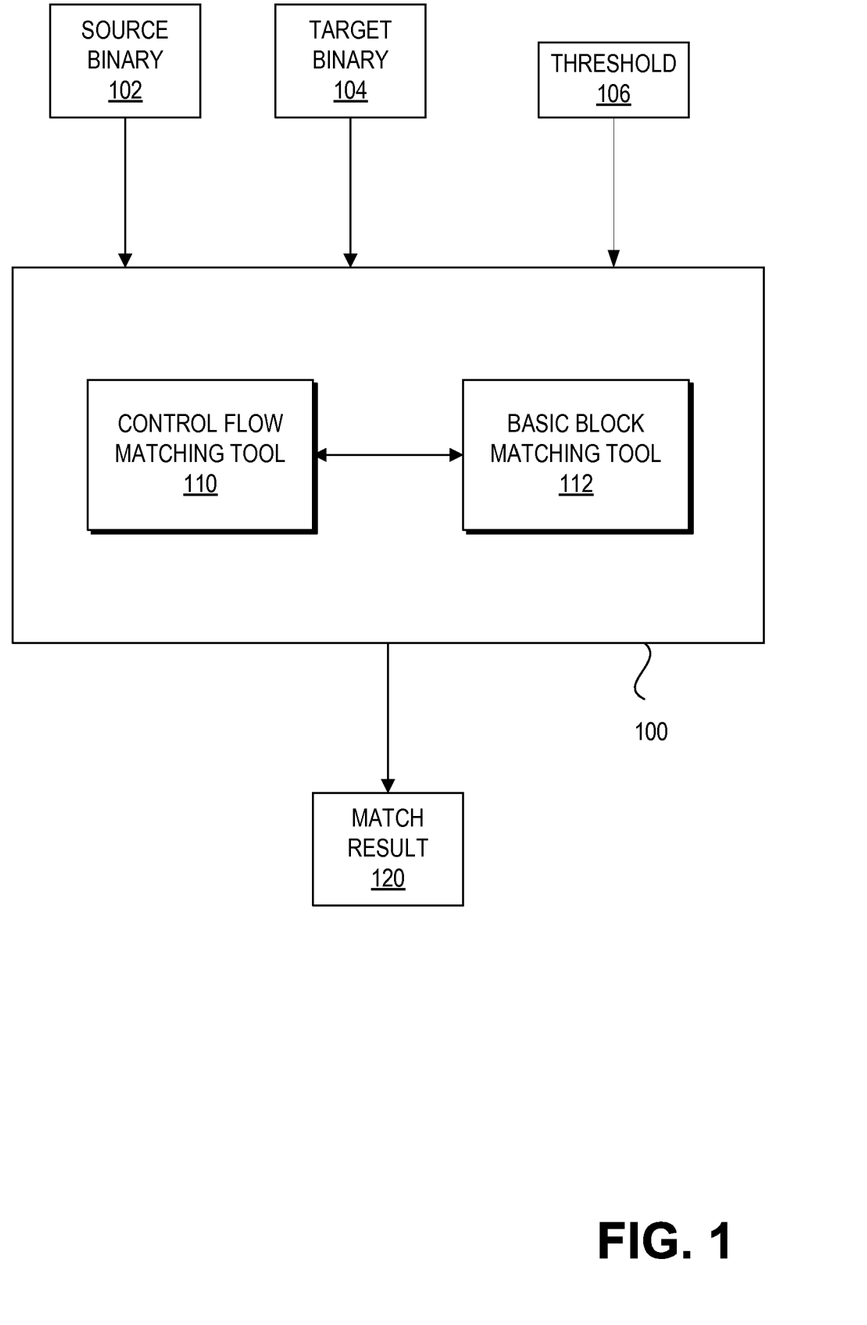
FIG. 1 is a block diagram of a function matching system in accordance with an embodiment of the invention.

FIG. 1 shows a function matching system 100 in accordance with an embodiment of the invention. Components of system 100 may be implemented using computer readable instructions executable by one or more computing devices. Embodiments of a computing device are described below in connection with FIG. 7.

Function matching system 100 includes a control flow matching tool 110 and a basic block matching tool 112. System 100 may receive a source binary 102 having one or more source functions and a target binary 104 having one or more target functions. System 100 uses tools 110 and 112 to find a target function in target binary 104 that best matches to a source function in source binary 102. In one embodiment, the function matching is accomplished without prior knowledge of source code of source binary 102 or target binary 104.

In one embodiment, control flow matching tool 110 may use a matching algorithm as described in "GRAPHDIFF: Matching and Patching Binaries", Saurabh Sinha, et al., International Conference on Software Engineering, 2002. In another embodiment, basic block matching tool 112 may use a matching algorithm as described in "BMAT—A Binary Matching Tool for Stale Profile Propagation," Zheng Wang, et al., Journal of Instruction-Level Parallelism, Vol. 2, May 2000. However, it will be appreciated that embodiments of the invention are not limited to the matching algorithms as described in the above publications.

It will be appreciated that one of ordinary skill in the art would not be motivated to combine the matching algorithms of BMAT and DIFFGRAPH to practice embodiments as described herein. For at least one reason, BMAT and DIFFGRAPH are targeted at different problems. BMAT is targeted to find differences between daily builds of a program and is particularly more focused on basic block matching. The assumption is made in BMAT that the program does not change much between daily builds. In contrast, DIFFGRAPH is designed to find differences between control flow and layouts of programs. These differences are often of greater scope than differences between daily builds. Further, embodiments of the invention include features not disclosed nor suggested by BMAT or DIFFGRAPH such as, but not limited to, performing a complete bipartite matching, setting match indices for control flow graph nodes, or computing a total control flow graph matching strength from match indices of individual nodes.

In one embodiment, system 100 may receive a threshold of correctness 106 that is used during the function matching. The threshold is an indication of the quality of the match of two basic blocks. When comparing two sets of basic blocks, only basic block matchings that exceed the threshold are considered.

Function matching system 100 may output a match result 120 that indicates which target functions in target binary 104 match to which source functions in source binary 102. It will be appreciated that in some cases, not all functions in target binary 104 will necessarily match to a function in source binary 102.

Figure 2:
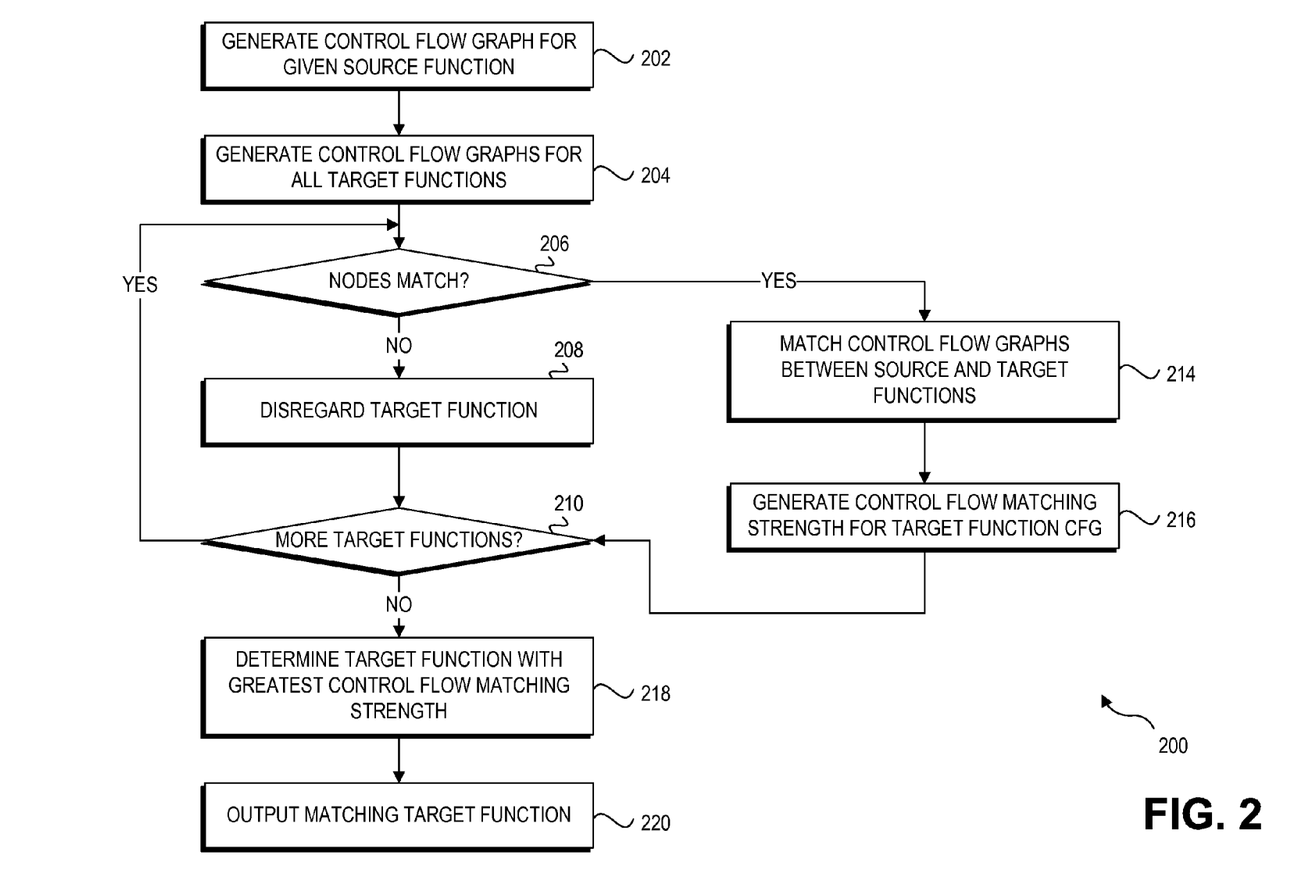
FIG. 2 is a flowchart showing the logic and operations of function matching in accordance with an embodiment of the invention.

Turning to FIG. 2, a flowchart 200 shows the logic and operations of function matching in accordance with an embodiment of the invention. In one embodiment, at least a portion of the logic of flowchart 200 may be implemented by computer readable instructions executable by one or more computing devices. In another embodiment, the logic of flowchart 200 may be used by function matching system 100. The logic shown in flowchart 200 may be used repeatedly to attempt to match all source functions in source binary 102 to a target function in target binary 104.

Starting in block 202, a control flow graph is generated for a given source function in the source binary. Next, in block 204, a control flow graph is generated for each of the target functions in the target binary. A basic block of a binary is a series of instructions with one entry point and one exit point. A Control Flow Graph (CFG) is a directed graph having nodes that represent the basic blocks of a function and the edges in the CFG represent all possible control flow between the basic blocks. In one embodiment, control flow matching tool 110 may create the control flow graphs for the source and target functions.

Figure 3:
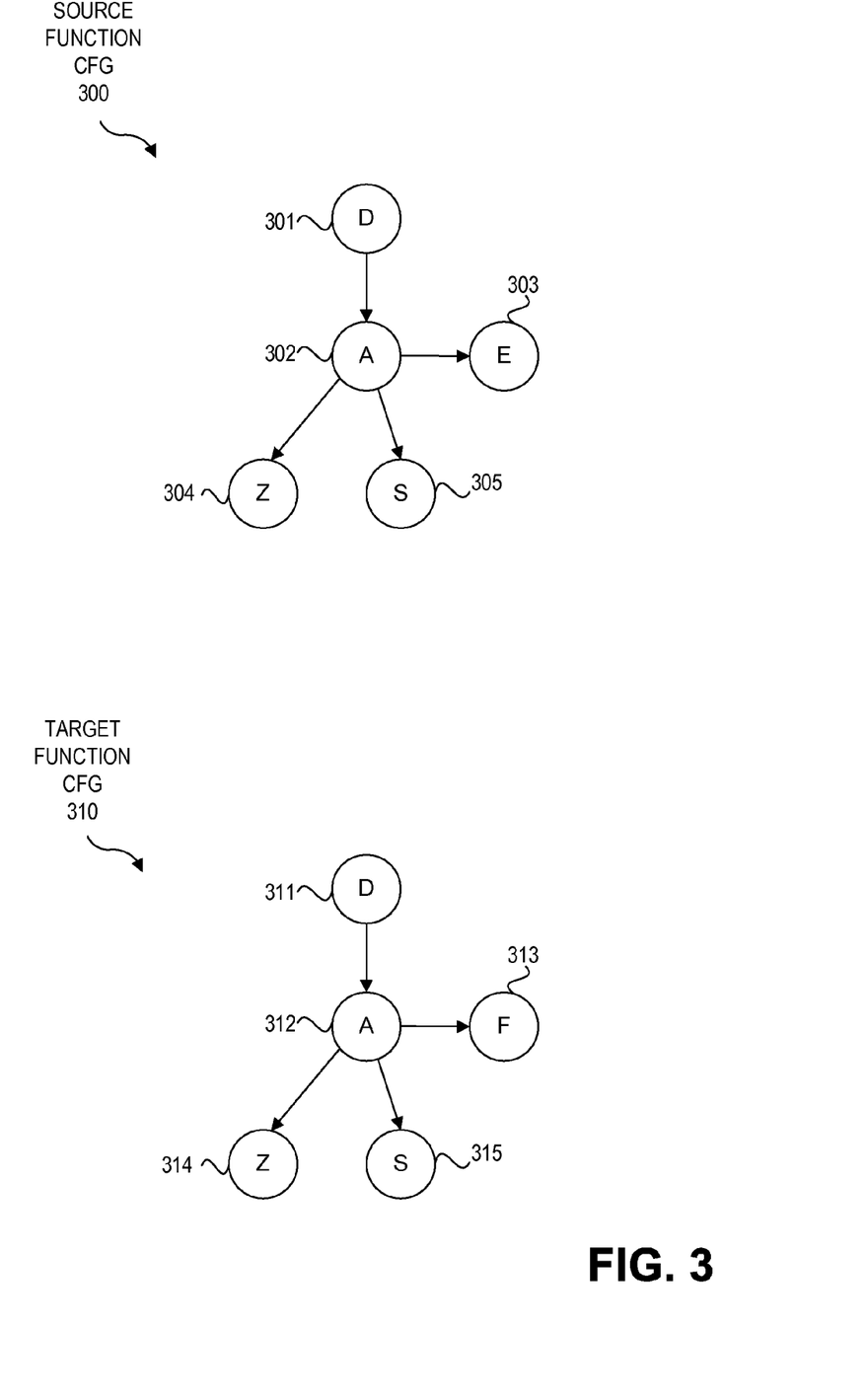
FIG. 3 shows control flow graphs for function matching in accordance with an embodiment of the invention.

Turning to FIG. 3, an embodiment of a source function CFG 300 and a target function CFG 310 is shown. Source function CFG 300 includes five nodes (i.e., basic blocks) 301-305 and target function CFG 310 includes five nodes (i.e., basic blocks) 311-315. Matching letters in the nodes of CFG 300 and 310 indicate theses nodes match. Edges between the nodes are shown by arrows.

As will be described below, the logic will iterate through all the target function CFGs to determine which ones have nodes (i.e., basic blocks) that match nodes in the source function CFG. If the nodes in a target function CFG match the nodes in the source function CFG, then that target function is marked for further analysis, while target function CFGs having poorly matching nodes are disregarded. The target function CFGs having matching nodes are then matched to the source function CFG and rated for control flow matching strength. The target function CFG with the best control flow matching strength is then determined to be the matching target function.

Proceeding to decision block 206, the logic of flowchart 200 determines if any node in a target function CFG matches any node in the given source function CFG. If there is at least one node in the source function CFG which has a matching node in the target function CFG, then a control flow matching is performed, such as in blocks 214 and 216. In one embodiment, the node matching is performed by basic block matching tool 112. In one embodiment, the nodes (i.e., basic blocks) are considered matching if the matching exceeds a given threshold. If the basic blocks do not match, then the logic continues to block 208 where the associated target function is disregarded as a possible match. An embodiment of basic block matching is discussed below in conjunction with FIG. 4.

Next, in decision block 210, then logic determines if there are more target functions for matching. If the answer to decision block 210 is yes, then the logic returns to decision block 206 to compare the nodes of the given source function CFG to the nodes of another target function CFG. If the answer to decision block 210 is no, then the logic proceeds to block 218 (discussed below).

In decision block 206, if any node matches, then the logic proceeds to block 214. In block 214, a match is performed between the source function CFG and the target function CFG. The logic measures the structural match of the CFGs for both functions. An embodiment of matching the CFGs is discussed below in conjunction with FIG. 5.

Proceeding to block 216, a control flow matching strength for the target function is generated. In one embodiment, the control flow matching strength is an integer value where a higher value indicates a better control flow match. After block 216, the logic proceeds to decision block 210 to determine if there are more target function CFGs that needed to be compared to the source function CFG.

Once all the target function CFGs have been compared to the source function CFG on a basic block level (and possibly on a control flow level in blocks 214 and 216), the logic proceeds to block 218. In block 218, the logic determines which target function has the greatest control flow matching strength. In one embodiment, the control flow matching strength is expressed as an integer value and the logic selects the target function having the largest integer value. Next, in block 220, the matching target function (or an associated target function identification) is output.

Figure 4:
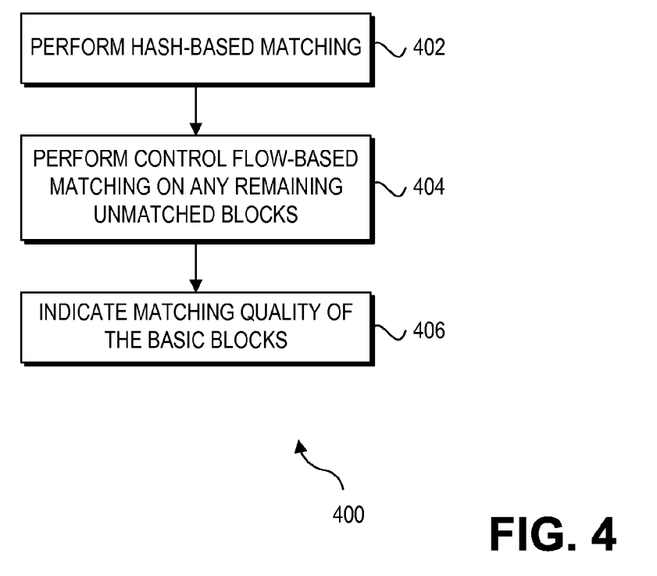
FIG. 4 is a flowchart showing the logic and operations of basic block matching in accordance with an embodiment of the invention.

Turning to FIG. 4, a flowchart 400 shows the logic and operations of matching basic blocks in CFGs in accordance with an embodiment of the invention. In one embodiment, at least a portion of the logic of flowchart 400 may be implemented by computer readable instructions executable by one or more computing devices.

Starting in block 402, a hash-based matching is performed. In one embodiment, a hash value is calculated using at least a portion of the contents of a basic block. If two basic blocks have the same hash value (i.e., a source function basic block and a target function basic block), then the basic blocks are a match. The basic block matching algorithm looks at the content of basic blocks to see if they match functionally, taking into account register renaming and other possible variations in the instruction pattern which do not affect the functionality of the basic block. For example, some information that may be filtered out include numerical offsets in memory address operands, register allocation, immediate operands (e.g., loop boundaries and program constants), and block address operands. Block address operands appear in control flow instructions (e.g., jump, branch, call, etc.) and pointer operations.

Multiple passes of matching are performed with various levels of fuzziness. At each level of fuzziness, less information is used in the hashing calculation. For example, the fuzziness levels may be from level 1 (most information and least approximation) to level 5 (least information and most approximation). In general, the levels that use more information provide accurate matches for blocks that have not changed or changed little while the fuzzier levels find matches for basic blocks that have changed considerably.

In one embodiment using a BMAT algorithm, information used in the hash calculation at each fuzziness level is as follows:

Level 1—The following block address operands are hashed: target block's match, target blocks extended name, target function name or branch offset within the function, and target block's distance from the beginning of the function. All operands and all opcodes are hashed. Registers EAX, ECX and EDX are converted to the same value for the hash. Numeral address offsets are excluded from the hash calculation in all levels 1-5.

Level 2—Same block address operands as level 1 except the address offset of the target block from the beginning of the function is excluded. This accommodates indirect changes that cause address shift for part of a function. All operands and all opcodes are hashed. Registers EAX, ECX and EDX are converted to the same value for the hash.

Level 3—The only block address operand hashed is the target function name or branch offset within the function. All opcodes are hashed. All immediate operands and operands of return instructions are excluded from the hashing. Registers EAX, ECX and EDX as well as EBX, EDI, and ESI are converted to the same value for the hashing calculation.

Level 4—For each instruction, hash the opcode and the types (but not the contents) of its operands. Registers and block address operands are excluded from the hash calculation.

Level 5—For each instruction, hash the opcode only.

Proceeding to block 404, a control flow-based matching is performed. The hashing-based matching focuses on identifying one-to-one matches between basic blocks. Any remaining blocks after the hash-based matching are matched with a block that is equivalent according to control flow. The logic travels through the source and target functions basic blocks simultaneously following the control flow to identify code that is comparable in terms of control flow. Unlike hash-based matching in block 402, the control flow-based matching may match several basic blocks in the same control flow branch to a single basic block in the other function. It will be appreciated that this control flow-based matching is part of the basic block matching algorithm of FIG. 4 and is not to be confused with CFG matching as described below in conjunction with FIG. 6.

Next, in block 406, the matching quality of the basic blocks in the target function CFG are indicated. The quality of the match for each basic block may be indicated on a scale of a strong match to a weak match. For example, matching quality may go from a scale of fuzziness level 1 (strongest match) to fuzziness level 5 to a control-flow match (weakest match). In one embodiment, the algorithm may output a match value between two basic blocks, based on the fuzziness levels/CF, that is expressed as a percentage match between the two basic blocks (e.g., 0-100% match).

In one embodiment, for the basic blocks in a target function CFG to match the basic blocks in the source function CFG (as in block 206 of flowchart 200), the match quality for a basic block must exceed a threshold. If there is at least one basic block in the source function CFG which has a matching basic block in the target function CFG, then a control flow matching is performed. In one embodiment, the threshold for basic block matching is 70% or more as returned by a BMAT algorithm.

Figure 5:
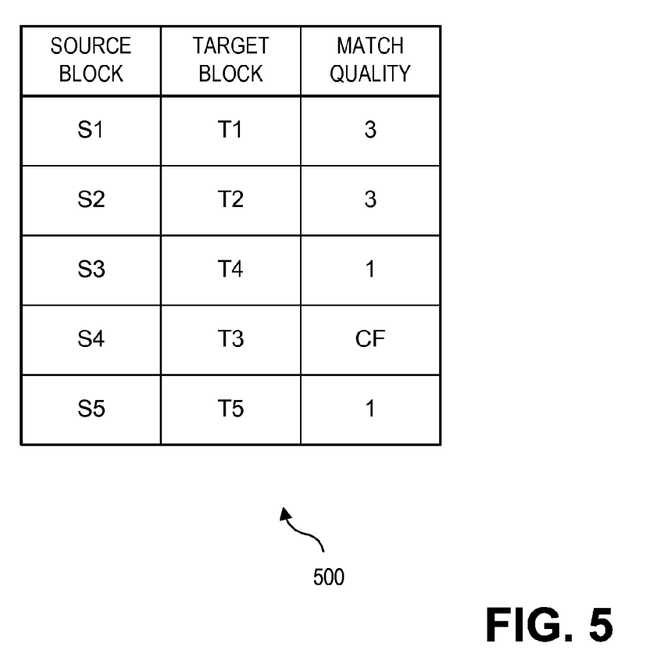
FIG. 5 is a match quality table in accordance with an embodiment of the invention.

In one embodiment, the basic block matching is described in a match quality table 500 as shown in FIG. 5. Table 500 includes each source function basic block, the matching target function basic block, and the fuzziness level at which the match is established (e.g., level 1 to 5) or whether the match was made at the control flow-based matching level (indicated by "CF" in table 500). In one embodiment, a basic block matching indication, such as table 500, is passed to a control flow matching algorithm as discussed in below in conjunction with FIG. 6.

Figure 6:
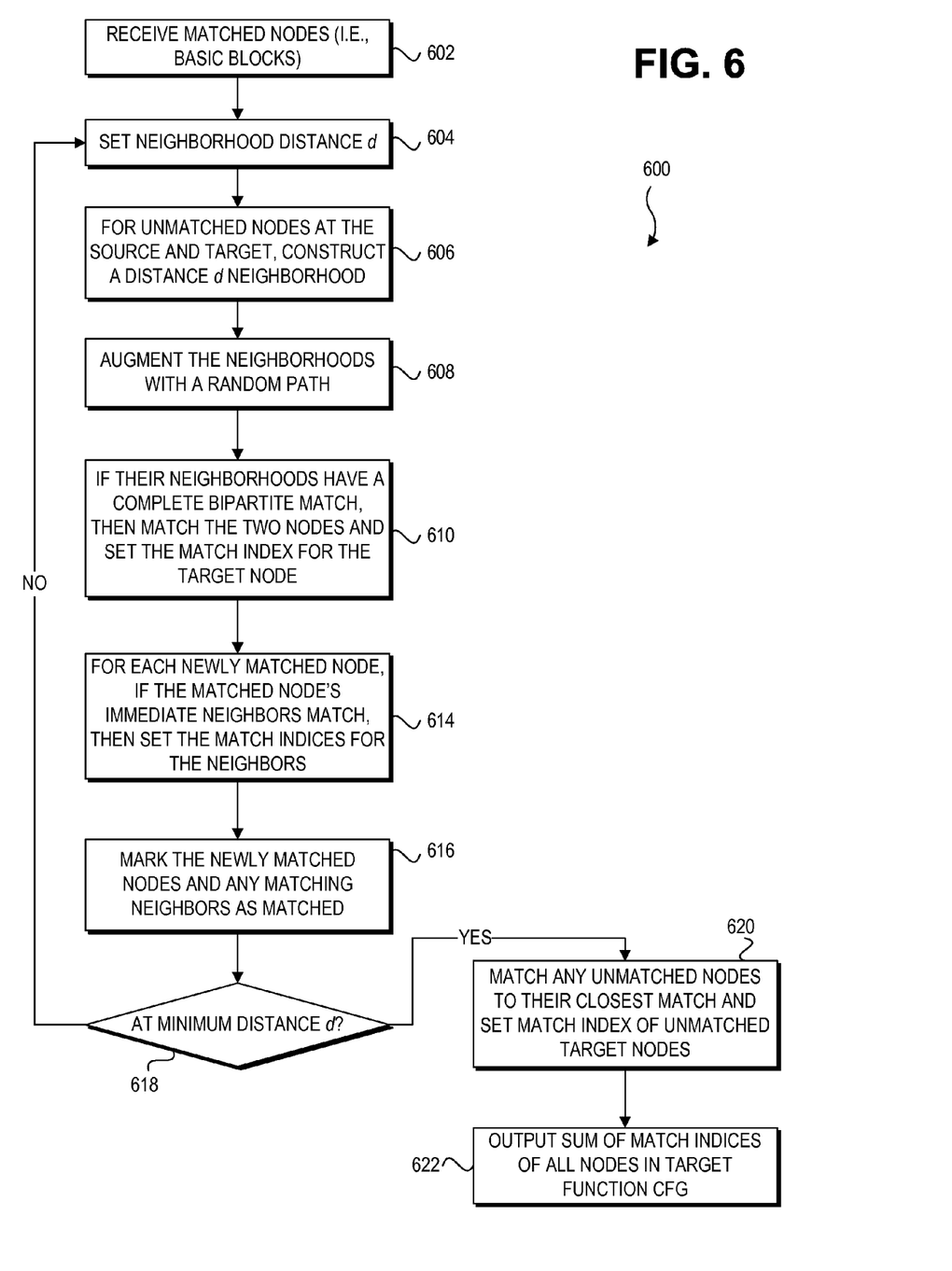
FIG. 6 is a flowchart showing the logic and operations of control flow graph matching in accordance with an embodiment of the invention.

Turning to FIG. 6, a flowchart 600 shows the logic and operations of matching control flow in CFGs, such as in blocks 214 and 216 of flowchart 200, in accordance with an embodiment of the invention. In one embodiment, at least a portion of the logic of flowchart 600 may be implemented by computer readable instructions executable by one or more computing devices.

Starting in block 602, an indication of the matched nodes (i.e., basic blocks) is received. In one embodiment, these matched nodes are from the basic block matching algorithm as discussed above in conjunction with FIG. 4. Next, in block 604, a neighborhood distance d is set for the source and target CFGs. A neighborhood distance d indicates a set of nodes from a node v (i.e., a basic block) in the CFG. For example, a distance d=0 from node v would simple be the set {v}. A distance d=1 from node v would include node v and node v's parents and children (if any). For example, in FIG. 3, the set of nodes a distance d=1 from node 302 includes nodes 301 and 303-305. In one embodiment, the neighborhood distance d may range between 3 and 1 and is initially set to d=3.

As described below, the logic incrementally reduces the size of the neighborhood until a minimum neighborhood distance is reached (for example, minimum of d=1). Nodes are considered to be a better match if the node was matched when the neighborhood distance d was larger. The strength or confidence of the match is reduced as the matching is performed on a smaller neighborhood distance d. The total match strength of the target function may be measured by an aggregation of the match strength of each node in the target function CFG.

Next, in block 606, for each unmatched node in the source and target function CFGs (i.e., nodes not matched in the basic block matching level), construct a distance d neighborhood from the unmatched nodes.

Next, in block 608, for each unmatched node in the source and target function CFGs, augment the neighborhoods constructed in block 606 with a random path. The random path is created for both for the source and the target function CFG neighborhoods. Thus, in one embodiment, a neighborhood includes the unmatched node, the nodes a distance d from the unmatched node, and the random path nodes. In one embodiment, the random path includes a set of nodes encountered while performing a fixed length random walk from the unmatched node. The walk will end before reaching the fixed length if the walk encounters a function boundary (e.g., call to another function or return).

Proceeding to block 610, a node from the target function CFG is matched to a node from the source function CFG if the neighborhoods around the nodes have a complete bipartite match (sometimes referred to as a "perfect match"). The bipartite matching is conducted for the neighborhood having distance d nodes as well as the random path nodes. As known to one skilled in the art, a complete bipartite match is a type of bipartite match where every vertex of the first set is connected to every vertex of the second set.

If a complete bipartite match is found, then a match index is set for the target function CFG node. In one embodiment, the match index is set to $2^d$.

Proceeding to block 614, for each newly matched target function CFG node, try and match the target function CFG node's immediate neighbors (i.e., the node's parents and children) to the matching source function CFG node's immediate neighbors. This is a basic block matching, where basic blocks are considered matching if the match quality exceeds a threshold. If the neighbors match, then set the match index for each neighbor the same as the newly matched target function CFG node. In one embodiment, the match index for each neighbor is set to $2^d$.

Continuing to block 616, the newly matched nodes in the source and target CFGs are marked as matched. Also, any immediate neighbors that matched in block 614 are also marked as matched. The nodes marked as matched will not be considered again in another iteration of the control flow matching algorithm.

Next, at decision block 618, the logic determines if the minimum neighborhood distance has been reached. If the answer is no, then the logic returns to block 604 to set the neighborhood distance d to a smaller neighborhood. The neighborhood distance d will be decreased to construct a smaller neighborhood for matching. In one embodiment, the initial distance d=3 and is set to d=2 in the second pass. In this embodiment, the minimum neighborhood distance is set to d=1.

If the answer to decision block 618 is yes, then the logic proceeds to block 620 where any unmatched nodes in the target function CFG are matched to their closest matching node in the source function CFG. The match indices for the unmatched nodes in the target function CFG are set. In one embodiment, the match indices are set to 1. Proceeding to block 622, the sum of all match indices for all the nodes in the target function CFG is generated and output. This sum is the control flow matching strength for this particular target function CFG.

Embodiments of the invention provide matching of functions in binaries. Embodiments herein may be used to identify binary code that plagiarizes the functionality of a binary but not necessary the syntax. Also, testers may use embodiments herein to identify differences in binary code and target their testing at the functions that have been changed between binary build versions.

Figure 7:
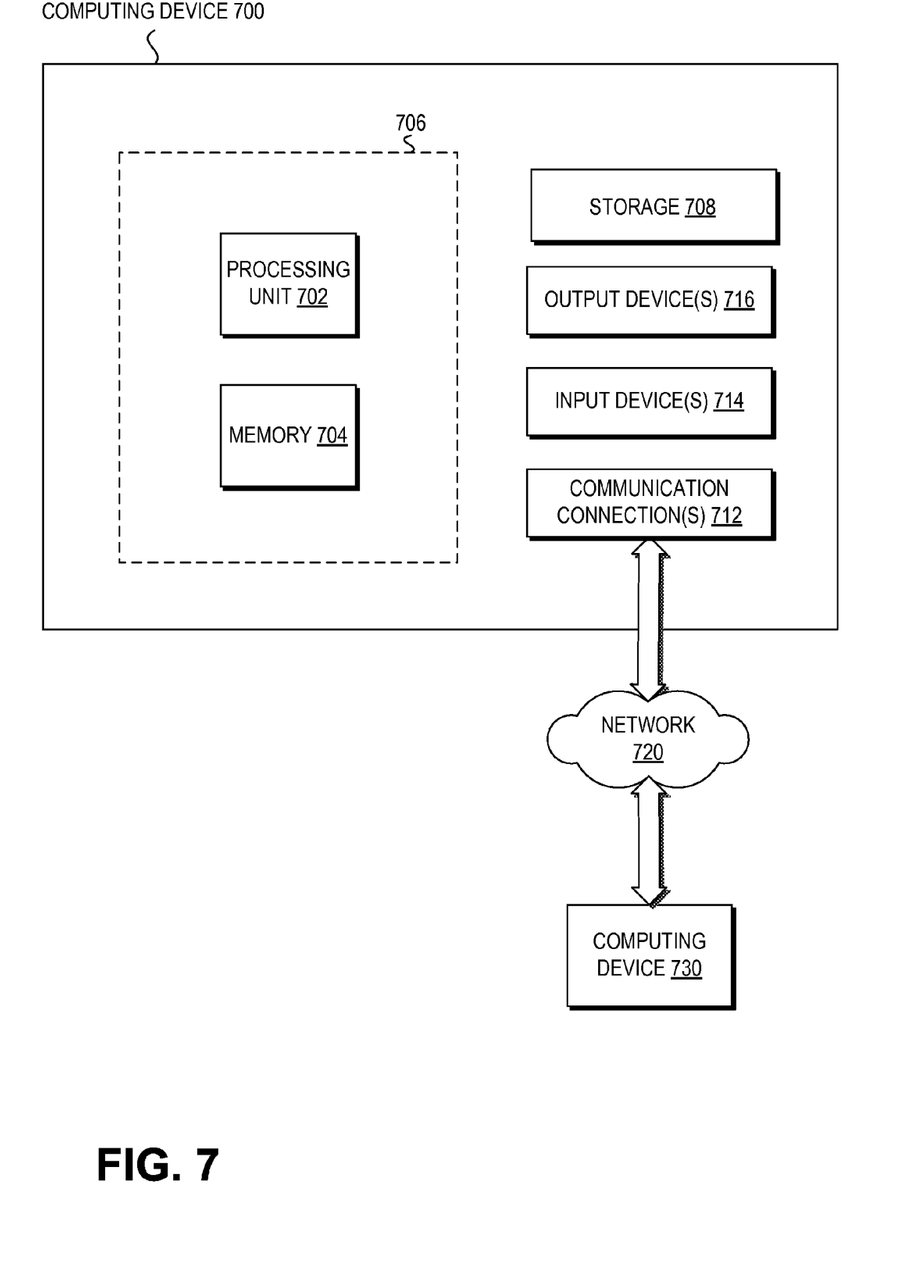
FIG. 7 is a block diagram of an example computing device for implementing embodiments of the invention.

FIG. 7 and the following discussion are intended to provide a brief, general description of a suitable computing environment to implement embodiments of the invention. The operating environment of FIG. 7 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 shows an example of a computing device 700 for implementing one or more embodiments of the invention. In one configuration, computing device 700 includes at least one processing unit 702 and memory 704. Depending on the exact configuration and type of computing device, memory 704 may be volatile (such as RAM), non-volatile (such as ROM, flash memory, etc.) or some combination of the two. This configuration is illustrated in FIG. 7 by dashed line 706.

In other embodiments, device 700 may include additional features and/or functionality. For example, device 700 may also include additional storage (e.g., removable and/or non-removable) including, but not limited to, magnetic storage, optical storage, and the like. Such additional storage is illustrated in FIG. 7 by storage 708. In one embodiment, computer readable instructions to implement embodiments of the invention may be in storage 708. Storage 708 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 704 and storage 708 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 700. Any such computer storage media may be part of device 700.

Device 700 may also include communication connection(s) 712 that allow device 700 to communicate with other devices. Communication connection(s) 712 may include, but is not limited to, a modem, a Network Interface Card (NIC), an integrated network interface, a radio frequency transmitter/receiver, an infrared port, a USB connection, or other interfaces for connecting computing device 700 to other computing devices. Communication connection(s) 712 may include a wired connection or a wireless connection. Communication connection(s) 712 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 700 may include input device(s) 714 such as keyboard, mouse, pen, voice input device, touch input device, infrared cameras, video input devices, and/or any other input device. Output device(s) 716 such as one or more displays, speakers, printers, and/or any other output device may also be included in device 700. Input device(s) 714 and output device(s) 716 may be connected to device 700 via a wired connection, wireless connection, or any combination thereof. In one embodiment, an input device or an output device from another computing device may be used as input device(s) 714 or output device(s) 716 for computing device 700.

Components of computing device 700 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 700 may be interconnected by a network. For example, memory 704 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 730 accessible via network 720 may store computer readable instructions to implement one or more embodiments of the invention. Computing device 700 may access computing device 730 and download a part or all of the computer readable instructions for execution. Alternatively, computing device 700 may download pieces of the computer readable instructions, as needed, or some instructions may be executed at computing device 700 and some at computing device 730. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
determining which target functions in a target binary have target function basic blocks that match source function basic blocks in a source function in a source binary by performing a hash-based matching between the target function basic blocks and the source function basic blocks, and performing a control flow-based matching on basic blocks that are unmatched after the hash-based matching, the control flow-based matching being performed within the unmatched basic blocks; and
for the target functions having matching target function basic blocks, determining a corresponding target function control flow graph that has a greatest control flow matching strength to a source function control flow graph, wherein a node in the source function control flow graph represents a source function basic block, wherein a node in a target function control flow graph represents a target function basic block.

2. The method of claim 1 wherein determining which target functions have target function basic blocks that match the source function basic blocks includes:
determining which target functions have a basic block matching quality that exceeds a threshold.

3. The method of claim 1, further comprising:
generating a control flow matching strength for each target function control flow graph corresponding to a target function having matching target function basic blocks.

4. The method of claim 3 wherein the control flow matching strength of a target function control flow graph is a summation of a control flow match index for each node of the target function control flow graph.

5. The method of claim 3 wherein generating a control flow matching strength for each target function control flow graph having matching nodes includes:
constructing a neighborhood around an unmatched node in the source function control flow graph at a neighborhood distance;
constructing a neighborhood around an unmatched node in the target function control flow graph at the neighborhood distance;
matching the unmatched node in the target function control flow graph to the unmatched node in the source function control flow graph when the neighborhoods have a complete bipartite match; and
setting a match index for the newly matched node in the target function control flow graph based on the neighborhood distance.

6. The method of claim 5, further comprising:
augmenting the neighborhoods around the unmatched nodes in the source function and the target function with a random path from the unmatched node in the source function control flow graph and a random path from the unmatched node in the target function control flow graph.

7. The method of claim 6, further comprising:
for the newly matched node in the target function control flow graph, determining if any immediate neighbor nodes of the newly matched node match to any immediate neighbor nodes of the matching source function control flow graph node; and
setting a match index for any matching neighborhood nodes in the target function control flow graph based on the neighborhood distance.

8. The method of claim 7, further comprising:
marking the newly matched nodes in the source function control flow graph and in the target function control flow graph as matched; and
marking any matching immediate neighbor nodes as matching.

9. One or more computer storage media storing computer readable instructions that when executed perform operations comprising:
generating a source function control flow graph for a source function in a source binary, wherein a node in the source function control flow graph represents a source function basic block;
generating a plurality of target function control flow graphs corresponding to a plurality of target functions in a target binary, wherein a node in a target function control flow graph represents a target function basic block in a corresponding target function;
determining which target functions have target function basic blocks that match the source function basic block by performing a hash-based matching between the target function basic blocks and the source function basic block, and performing a control flow-based matching on basic blocks that are unmatched after the hash-based matching, the control flow-based matching being performed within the unmatched basic blocks; and
for the target functions having matching target function basic blocks,
generating a control flow matching strength for each target function control flow graph corresponding to a target function having matching target function basic blocks; and
determining the target function control flow graph that has a greatest control flow matching strength to the source function control flow graph.

10. The one or more computer storage media of claim 9 wherein determining which target functions have target function basic blocks that match the source function basic blocks includes,
determining which target functions have a basic block matching quality that exceeds a threshold.

11. The one or more computer storage media of claim 9 wherein the control flow matching strength of a target function control flow graph is a summation of a control flow match index for each node of the target function control flow graph.

12. The one or more computer storage media of claim 9 wherein generating a control flow matching strength includes:
- constructing a neighborhood around an unmatched node in the source function control flow graph at a neighborhood distance;
- constructing a neighborhood around an unmatched node in the target function control flow graph at the neighborhood distance;
- matching the unmatched node in the target function control flow graph to the unmatched node in the source function control flow graph when the neighborhoods have a complete bipartite match; and
- setting a match index for the newly matched node in the target function control flow graph based on the neighborhood distance.

13. The one or more computer storage media of claim 12 wherein the computer readable instructions when executed further perform operations comprising:
- augmenting the neighborhoods around the unmatched nodes in the source function and the target function with a random path from the unmatched node in the source function control flow graph and a random path from the unmatched node in the target function control flow graph.

14. The one or more computer storage media of claim 13 wherein the computer readable instructions when executed further perform operations comprising:
- for the newly matched node in the target function control flow graph, determining if the immediate neighbor nodes of the newly matched node match to the immediate neighbor nodes of the matching source function control flow graph node; and
- setting a match index for any matching neighborhood nodes in the target function control graph based on the neighborhood distance.

15. The one or more computer storage media of claim 14 wherein the computer readable instructions when executed further perform operations comprising:
- marking the newly matched nodes in the source function control flow graph and in the target function control flow graph as matched; and
- marking any matching immediate neighbor nodes as matching.

16. A function matching system, comprising:
- a processing unit; and
- a memory operatively coupled to the processing unit to provide:
- a basic block matching tool to determine which target functions in a target binary have target function basic blocks that match source function basic blocks in a source binary by performing a hash-based matching between the target function basic blocks and the source function basic blocks, and performing a control flow-based matching on basic blocks that are unmatched after the hash-based matching, the control flow-based matching being performed within the unmatched basic blocks; and
- a control flow matching tool communicatively coupled to the basic block matching tool, the control flow matching tool to determine a corresponding target function control flow graph that has a greatest control flow matching strength to a source function control flow graph for the target functions having matching target function basic blocks.

17. The function matching system of claim 16 wherein to determine which target functions have target function basic blocks that match the source function basic blocks includes determining which target functions have a basic block matching quality that exceeds a threshold.

18. The function matching system of claim 16 wherein the control flow matching strength of a target function control flow graph is a summation of a control flow match index for each node of the target function control flow graph.

* * * * *